(12) United States Patent
Welch

(10) Patent No.: US 11,582,132 B2
(45) Date of Patent: Feb. 14, 2023

(54) SYSTEMS AND METHODS FOR IDENTIFYING UNKNOWN PROTOCOLS ASSOCIATED WITH INDUSTRIAL CONTROL SYSTEMS

(71) Applicant: Verizon Patent and Licensing Inc., Arlington, VA (US)

(72) Inventor: Richard L. Welch, Boulder, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 672 days.

(21) Appl. No.: 16/671,928

(22) Filed: Nov. 1, 2019

(65) Prior Publication Data
US 2021/0133601 A1    May 6, 2021

(51) Int. Cl.
*H04L 43/18* (2022.01)
(52) U.S. Cl.
CPC .................................. *H04L 43/18* (2013.01)
(58) Field of Classification Search
CPC ....................................................... H04L 43/18
See application file for complete search history.

(56) References Cited

U.S. PATENT DOCUMENTS

| | | | | |
|---|---|---|---|---|
| 6,175,874 B1 * | 1/2001 | Imai | ...................... | H04L 45/745 709/205 |
| 2011/0314547 A1 * | 12/2011 | Yoo | ......................... | G06F 21/56 726/24 |

\* cited by examiner

*Primary Examiner* — Azizul Choudhury

(57) ABSTRACT

A device may receive a hash table that includes lists of protocol detectors, wherein the hash table is generated based on historical process data identifying potential process variables associated with an industrial control system. The device may receive a packet identifying potential process variables associated with the industrial control system, and may extract, from the packet, packet data identifying a source address, a destination address, a port, and a transport protocol. The device may compare the packet data with data in the hash table to identify a set of lists of protocol detectors, and may process the packet data, with the set of lists of protocol detectors, to determine a matching protocol, no matching protocol, or a potential matching protocol for the packet. The device may perform one or more actions based on determining the matching protocol, no matching protocol, or the potential matching protocol for the packet.

20 Claims, 13 Drawing Sheets

SYSTEMS AND METHODS FOR IDENTIFYING UNKNOWN PROTOCOLS ASSOCIATED WITH INDUSTRIAL CONTROL SYSTEMS

BACKGROUND

An industrial control system may include several types of control systems and associated instrumentation used for industrial process control. The industrial control system can range from a few modular panel-mounted controllers to large interconnected and interactive distributed control systems with thousands of field connections. The industrial control system receives data from remote sensors measuring industrial process variables, compares the sensor data with set points, and derives command functions used to control an industrial process through control elements (e.g., control valves, circuits, power sources, and/or the like).

DETAILED DESCRIPTION OF PREFERRED EMBODIMENTS

Figure 1A:
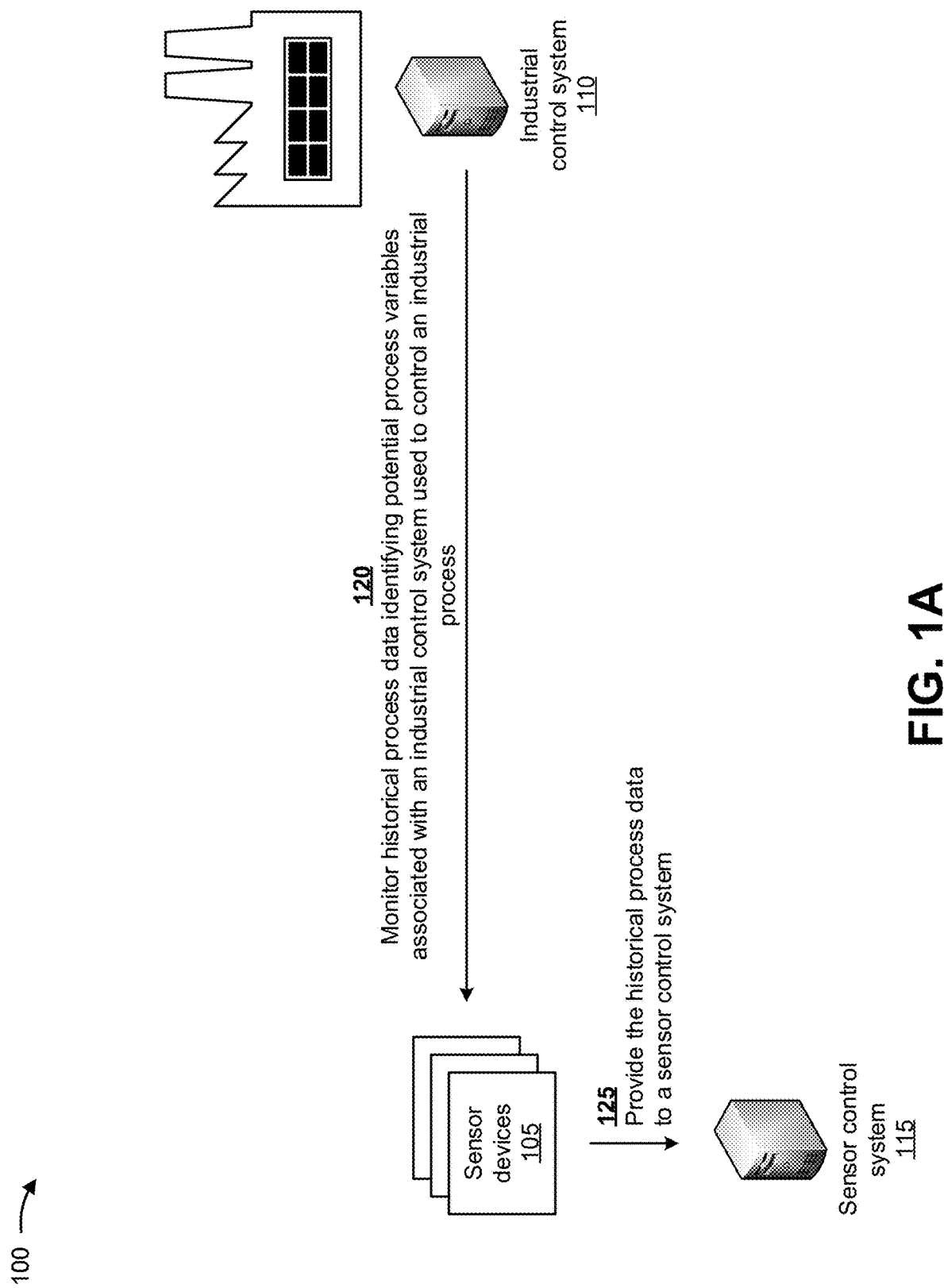
FIGS. 1A-1J are diagrams of one or more example implementations described herein.

The following detailed description of example implementations refers to the accompanying drawings. The same reference numbers in different drawings may identify the same or similar elements.

Sensor devices may be utilized to monitor an industrial control system and industrial process variables collected by the industrial control system. However, many times vendor specific and proprietary protocols are utilized by the industrial control system when collecting the process variables. In such situations, it is difficult for the sensor devices to identify unknown protocols utilized by the industrial control system and considerable time and resources may be required in order to identify the unknown protocols. Thus, current techniques for monitoring an industrial control system waste computing resources (e.g., processing resources, memory resources, communication resources, and/or the like), networking resources, and/or the like associated with collecting data that cannot be utilized due to unknown protocols, identifying the unknown protocols, re-collecting the data after identifying the unknown protocols, and/or the like.

Some implementations described herein provide a device (e.g., a sensor device) for identifying unknown protocols associated with industrial control systems. For example, the sensor device may receive a hash table that includes lists of protocol detectors. The hash table may be generated based on historical process data identifying potential process variables associated with an industrial control system used to control an industrial process. The sensor device may receive a packet identifying one or more process variables associated with the industrial control system, and may extract, from the packet, packet data identifying a source address, a destination address, a port, and a transport protocol associated with the packet. The sensor device may compare the packet data with data in the hash table to identify a set of lists of protocol detectors from the lists of protocol detectors included in the hash table, and may process the packet data, with the set of lists of protocol detectors, to determine one of a matching protocol, no matching protocol, or a potential matching protocol for the packet. The sensor device may perform one or more actions based on determining the one of the matching protocol, no matching protocol, or the potential matching protocol for the packet.

In this way, the sensor device identifies unknown protocols associated with industrial control systems. The sensor device may quickly and easily identify and extract features from unknown protocols associated with an industrial control system where protocol information is typically provided in a single packet. The sensor device may identify the unknown protocols in a port agnostic way so that port information is not required to identify the unknown protocols. Thus, the sensor device conserves computing resources, networking resources, and/or the like that would otherwise be wasted in collecting data that cannot be utilized due to unknown protocols, identifying the unknown protocols, re-collecting the data after identifying the unknown protocols, and/or the like.

FIGS. 1A-1J are diagrams of one or more example implementations 100 described herein. As shown in FIG. 1A, sensor devices 105 may be associated with an industrial control system 110 and a sensor control system 115. Sensor devices 105 may include packet sniffers, network probes, packet analyzers, network analyzers, protocol analyzers, and/or the like that may interact with and/or transmit/receive information to/from industrial control system 110. In some implementations, sensor devices 105 may identify unknown protocols associated with industrial control system 110. Industrial control system 110 may include one or more control systems and associated instrumentation used for industrial process control. Sensor control system 115 may include a platform that performs analysis on data (e.g., packets) received by sensor devices 105.

As further shown in FIG. 1A, and by reference number 120, sensor devices 105 may monitor historical process data identifying potential process variables associated with industrial control system 110 used to control an industrial process. In some implementations, the historical process data may include other information captured by sensor devices 105, such as any Internet protocol (IP)-based protocol traffic, historical traffic, control traffic, safety system traffic, information technology-related protocols, and/or the like associated with industrial control system 110. In some implementations, the process variables may include pressures, temperatures, flows, levels, and/or the like associated with the industrial process. Industrial control system 110 may be associated with instruments that monitor and control the industrial process to keep the industrial process within predetermined limits. The parameters or quantities to be controlled to the predetermined limits may include the process variables. Because the process variables can and do change, industrial control system 110 may measure the process variables and may control the process variables to keep the process variables within the predetermined limits. In some implementations, industrial control system 110 may utilize vendor specific and proprietary protocols when collecting the historical process data. In such implementations, the historical process data may include unknown protocols utilized by industrial control system 110.

As further shown in FIG. 1A, and by reference number 125, sensor devices 105 may provide the historical process data to sensor control system 115. In some implementations, sensor control system 115 may analyze the historical process data to identify different protocols associated with the historical process data. Alternatively, or additionally, sensor devices 105 may not provide the historical process data to sensor control system 115 and may analyze the historical process data to identify different protocols associated with the historical process data.

Figure 1B:
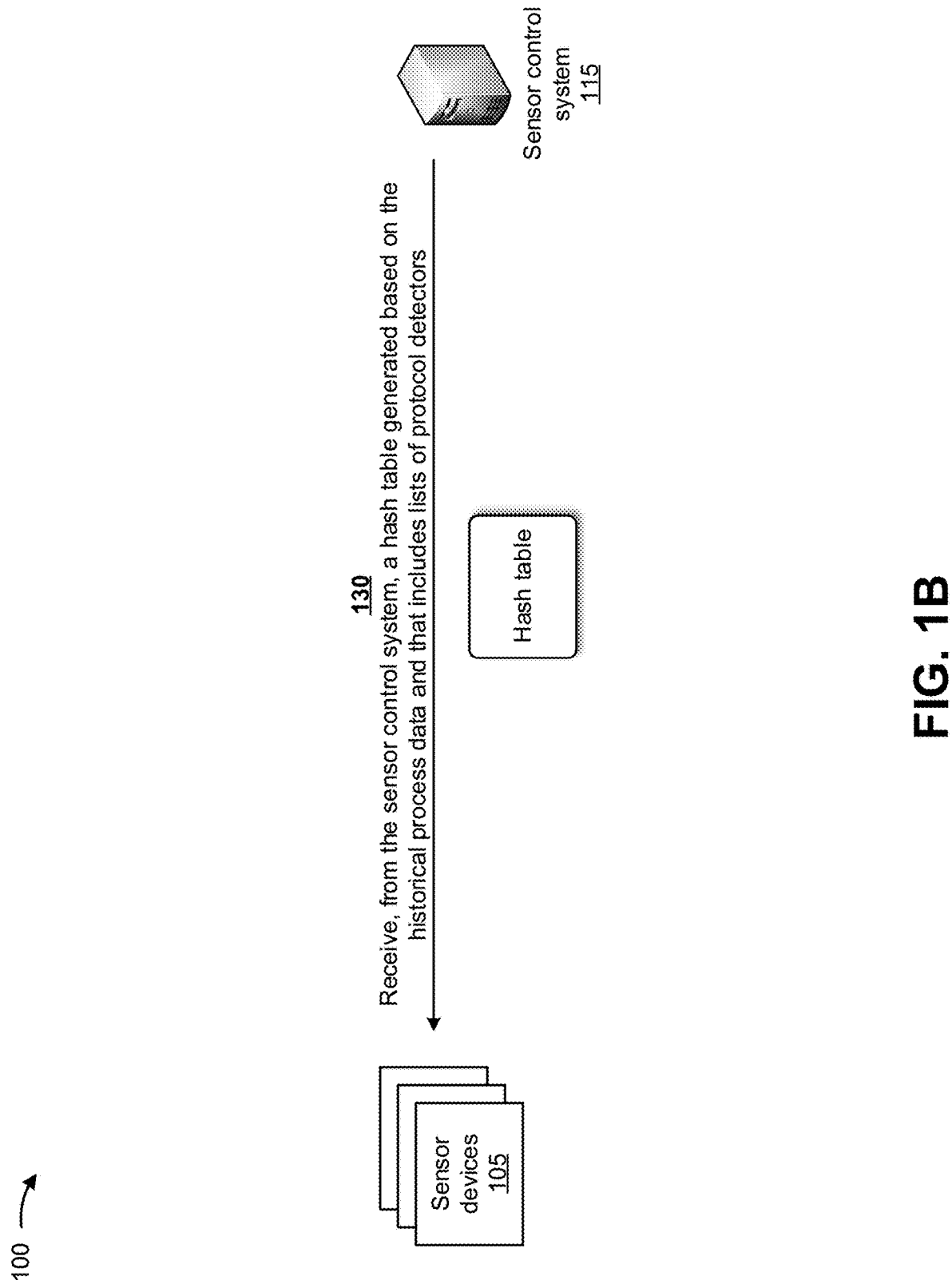

As shown in FIG. 1B, and by reference number 130, sensor devices 105 may receive, from sensor control system 115, a hash table generated based on the historical process data and that includes lists of protocol detectors. Alternatively, or additionally, one or more sensor devices 105 may generate the hash table based on the historical process data (e.g., rather than receiving the hash table from sensor control system 115), and may share the hash table with other sensor devices 105. In some implementations, sensor devices 105 may store the hash table in data structures (e.g., databases, tables, lists, and/or the like) associated with sensor devices 105.

In some implementations, sensor control system 115 may process the historical process data, with a machine learning model, to generate the hash table that includes the lists of protocol detectors. Sensor control system 115 may train the machine learning model with historical data (e.g., historical process data previously received from sensor devices 105, process data associated with other sensor devices 105 and/or other industrial control systems 110, identified protocols associated with the process data, and/or the like) to generate a trained machine learning model. In some implementations, the machine learning model may include a random forest machine learning model. In some implementations, sensor control system 115 may separate the historical data into a training set, a validation set, a test set, and/or the like. The training set may be utilized to train the machine learning model. The validation set may be utilized to validate results of the trained machine learning model. The test set may be utilized to test operation of the machine learning model.

In some implementations, sensor control system 115 may train the machine learning model using, for example, an unsupervised training procedure and based on the historical data. For example, sensor control system 115 may perform dimensionality reduction to reduce the historical data to a minimum feature set, thereby reducing resources (e.g., processing resources, memory resources, and/or the like) to train the machine learning model, and may apply a classification technique to the minimum feature set.

In some implementations, sensor control system 115 may use a logistic regression classification technique to determine a categorical outcome (e.g., that the historical data is associated with particular protocols). Additionally, or alternatively, sensor control system 115 may use a naïve Bayesian classifier technique. In this case, sensor control system 115 may perform binary recursive partitioning to split the historical data into partitions and/or branches and use the partitions and/or branches to determine outcomes (e.g., that the historical data is associated with particular protocols). Based on using recursive partitioning, sensor control system 115 may reduce utilization of computing resources relative to manual, linear sorting and analysis of data points, thereby enabling use of thousands, millions, or billions of data points to train the machine learning model, which may result in a more accurate model than using fewer data points.

Additionally, or alternatively, sensor control system 115 may use a support vector machine (SVM) classifier technique to generate a non-linear boundary between data points in the training set. In this case, the non-linear boundary is used to classify test data into a particular class.

Additionally, or alternatively, sensor control system 115 may train the machine learning model using a supervised training procedure that includes receiving input to the machine learning model from a subject matter expert, which may reduce an amount of time, an amount of processing resources, and/or the like to train the machine learning model relative to an unsupervised training procedure. In some implementations, sensor control system 115 may use one or more other model training techniques, such as a neural network technique, a latent semantic indexing technique, and/or the like. For example, sensor control system 115 may perform an artificial neural network processing technique (e.g., using a two-layer feedforward neural network architecture, a three-layer feedforward neural network architecture, and/or the like) to perform pattern recognition with regard to patterns of the historical data. In this case, using the artificial neural network processing technique may improve an accuracy of the trained machine learning model generated by sensor control system 115 by being more robust to noisy, imprecise, or incomplete data, and by enabling sensor control system 115 to detect patterns and/or trends undetectable to human analysts or systems using less complex techniques.

In some implementations, rather than training the machine learning models, sensor control system 115 may receive a trained machine learning model from another device (e.g., a server device). For example, a server device may generate the trained machine learning model based on having trained the machine learning model in a manner similar to that described above, and may provide the trained machine learning model to sensor control system 115 (e.g., may pre-load sensor control system 115 with the trained machine learning model, may receive a request from sensor control system 115 for the trained machine learning model, and/or the like). In some implementations, sensor control platform 115 may utilize the trained machine learning model to generate the hash table based on the historical process data received from sensor devices 105.

Alternatively, or additionally, one or more sensor devices 105 may train the machine learning model in the manner described above, may receive the trained machine learning model from another device (e.g., the server device or sensor control system 115), and/or the like. The one or more sensor devices 105 may utilize the trained machine learning model to generate the hash table based on the historical process data received by sensor devices 105.

Figure 1C:
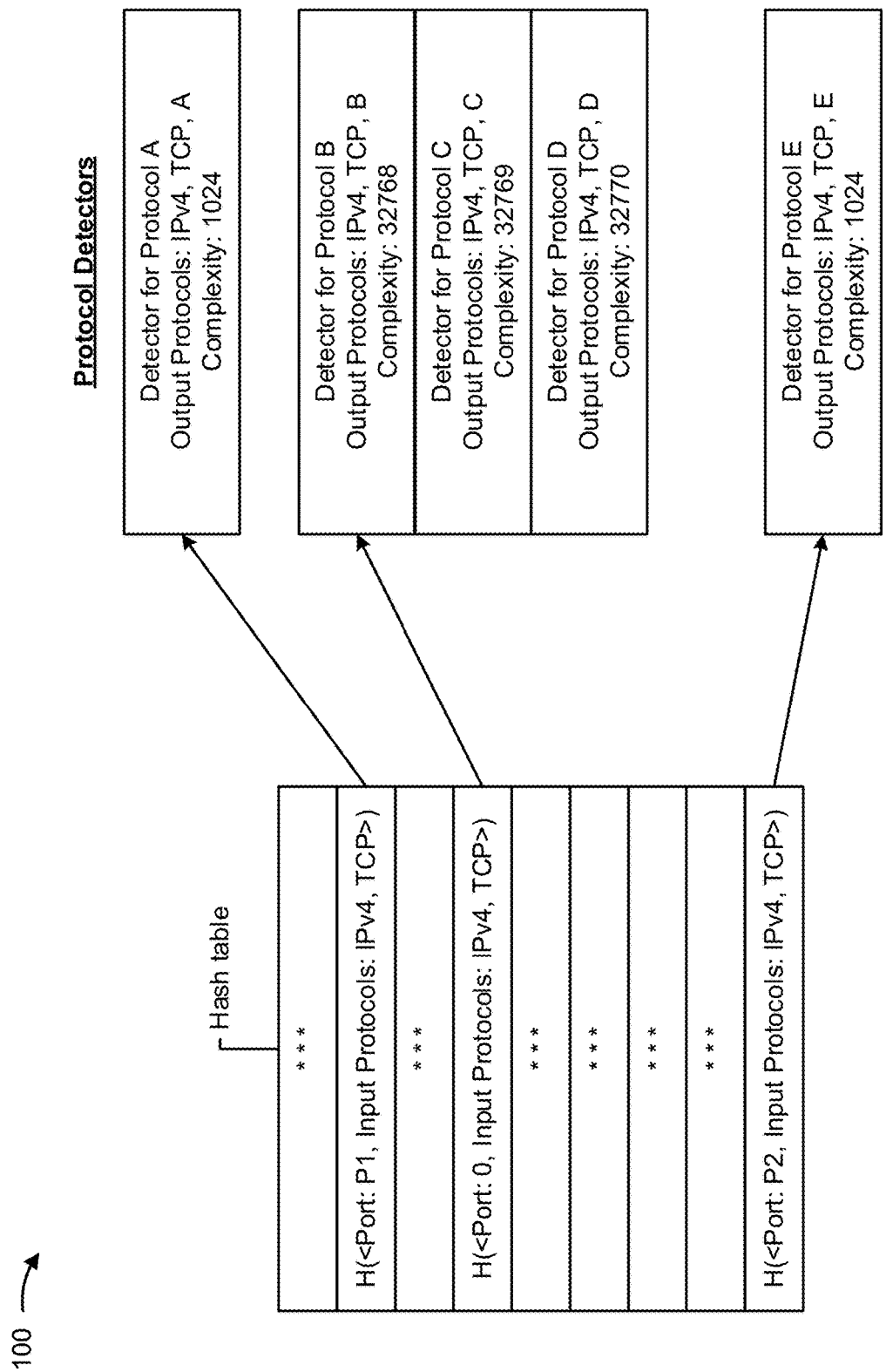

As shown in FIG. 1C, the hash table may include lists of protocol detectors, such as a first list of protocol detectors associated with a port (e.g., Port: P1), input protocols (e.g., Input Protocols: Internet Protocol version 4 (IPv4), transmission control protocol (TCP)), and/or the like; a second list of protocol detectors associated with a dummy value (or unknown) port (e.g., Port: 0), input protocols (e.g., Input Protocols: IPv4, TCP), and/or the like; and a third list of protocol detectors associated with a port (e.g., Port: P2), input protocols (e.g., Input Protocols: IPv4, TCP), and/or the like. The first list of protocol detectors may include a protocol detector for detecting a protocol (e.g., Protocol A) associated with output protocols (e.g., IPv4, TCP, Protocol A) and a complexity (e.g., a value, such as "1024").

The input protocols may include protocols used by packets received from industrial control system 110. The output protocols may specify protocols to be associated with the packets. The complexity may provide a measure of complexity associated with a protocol detector (e.g., where a lower number indicates less complexity and a greater number indicates more complexity). In some implementations, if a port is identified in a protocol detector, then the protocol detector may be less complex. In some implementations, the protocol detectors in each list of protocol detectors may be ordered by port, ordered based on complexity, and/or the like.

The second list of protocol detectors may include a protocol detector for detecting a protocol (e.g., Protocol B) associated with output protocols (e.g., IPv4, TCP, Protocol B) and a complexity (e.g., a value, such as "32768"); a protocol detector for detecting a protocol (e.g., Protocol C) associated with output protocols (e.g., IPv4, TCP, Protocol C) and a complexity (e.g., a value, such as "32769"); and a protocol detector for detecting a protocol (e.g., Protocol D) associated with output protocols (e.g., IPv4, TCP, Protocol D) and a complexity (e.g., a value, such as "32770").

The third list of protocol detectors may include a protocol detector for detecting a protocol (e.g., Protocol E) associated with output protocols (e.g., IPv4, TCP, Protocol E) and a complexity (e.g., a value, such as "1024").

In some implementations, for protocols with well-known or common ports, the hash table may include protocol detectors with port values as keys. For protocols that do not have well-known or common ports, the hash table may include protocol detectors with dummy port values (e.g., values of zero).

Figure 1D:
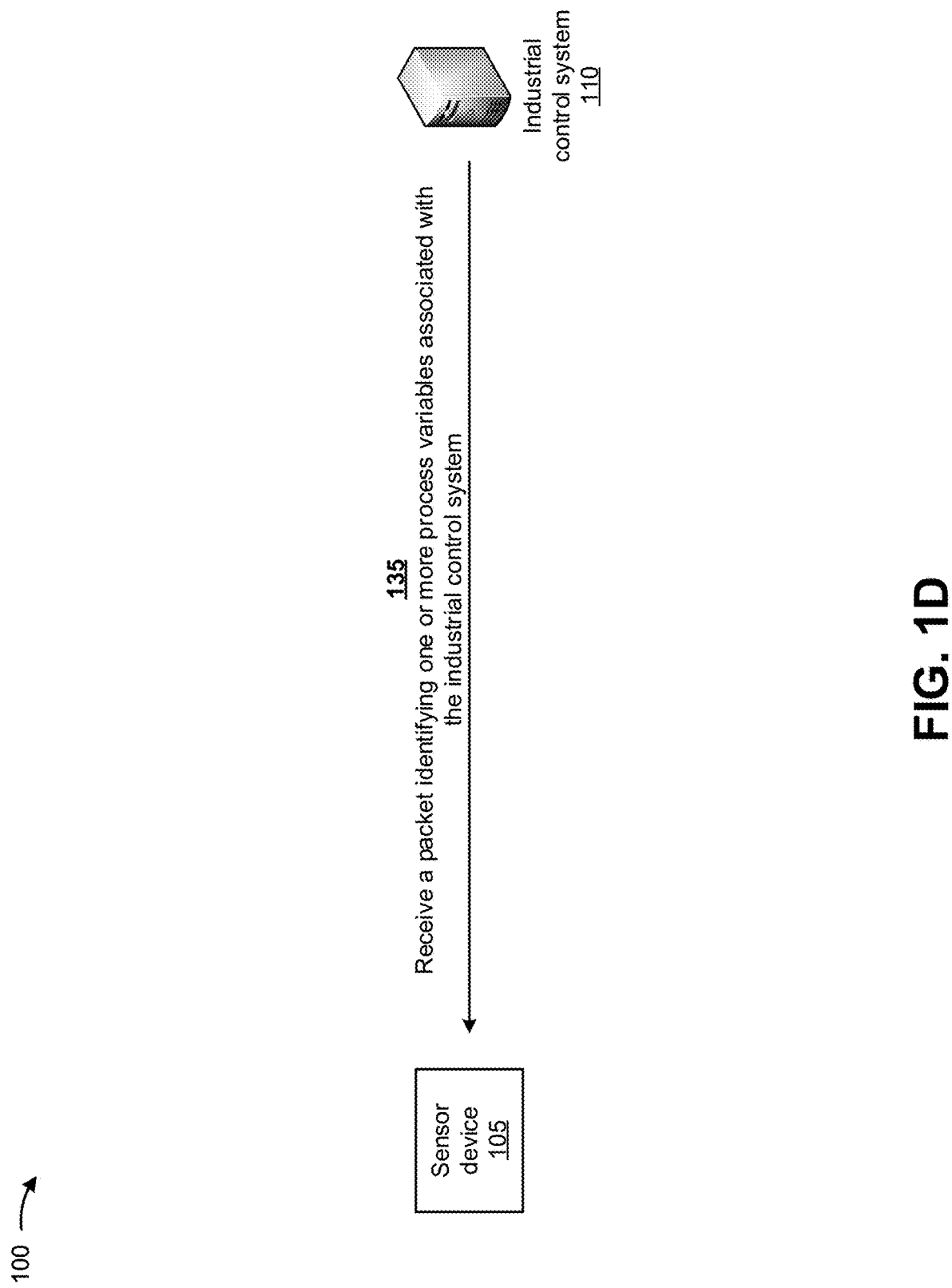

As shown in FIG. 1D, and by reference number 135, sensor device 105 may receive, from industrial control system 110, a packet identifying one or more process variables associated with industrial control system 110. In some implementations, the one or more process variables may include pressures, temperatures, flows, levels, and/or the like associated with the industrial process controlled by industrial control system 110. The packet may include data identifying a source address (e.g., a source IP address) of an instrument that generated the packet; a destination address (e.g., a destination IP address) associated with industrial equipment monitored by the instrument or associated with industrial control system 110, a port associated with the instrument, a transport protocol, and/or the like. In some implementations, the packet may include protocol information associated with an unknown protocol, may include port information, may not include port information, and/or the like. In some implementations, the packet may not include physical quantities of process variables but may include binary data that may be interpreted as physical quantities of process variables.

Figure 1E:
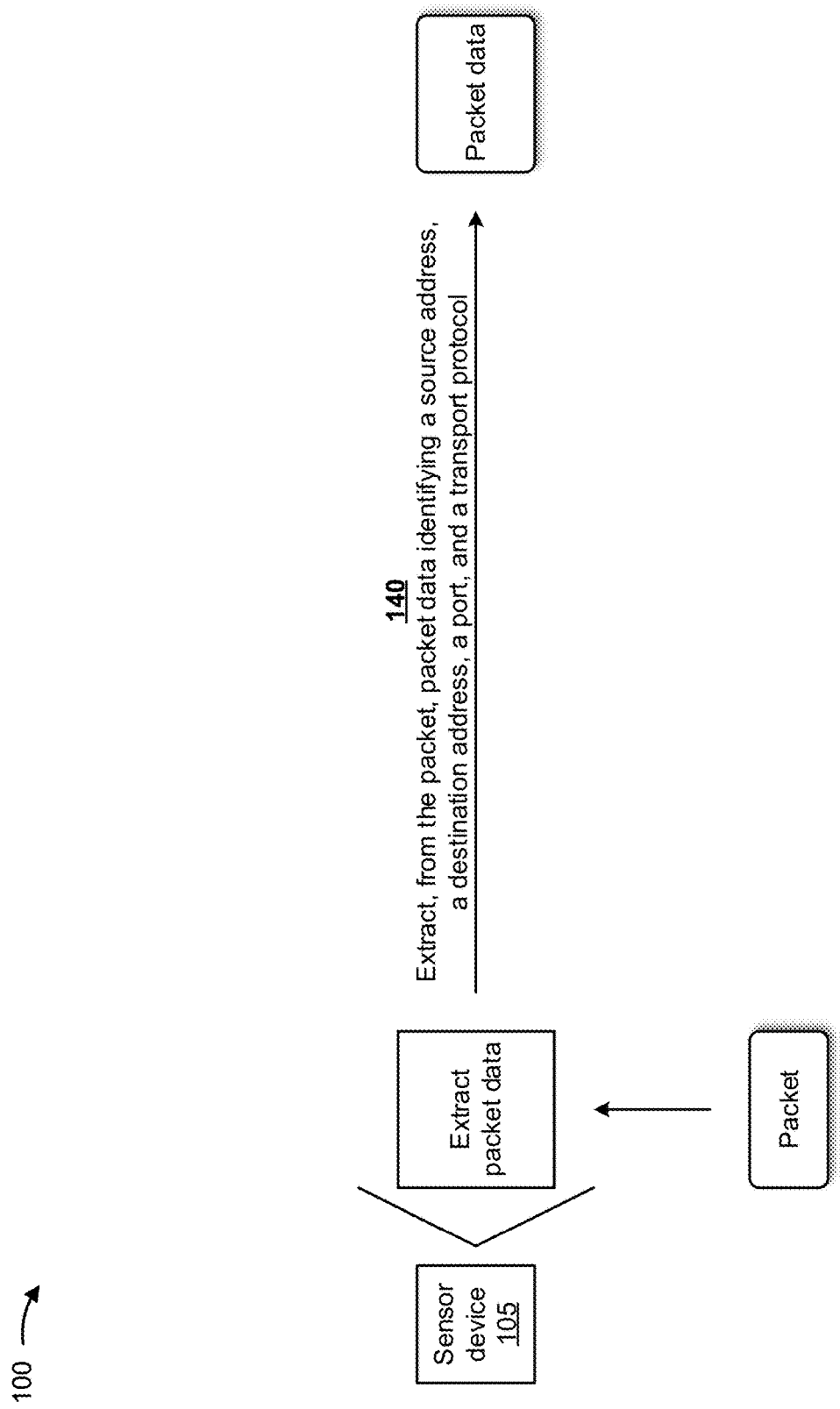

As shown in FIG. 1E, and by reference number 140, sensor device 105 may extract, from the packet, packet data identifying the source address, the destination address, the port, the transport protocol, and/or the like associated with the packet. In some implementations, the packet may include particular packet data at particular locations of the packet. For example, the packet may include a header portion where the source address, the destination address, and the port may be identified. The header portion may further include a plurality of bytes that identify other information. For example, a first byte position (e.g., byte position 0) may include a first field width (e.g., 16 bits) and a first field description (e.g., a constant value); a second byte position (e.g., byte position 2) may include a second field width (e.g., 8 bits) and a second field description (e.g., a protocol version); a third byte position (e.g., byte position 4) may include a third field width (e.g., 16 bits) and a third field description (e.g., a packet length); and/or the like.

In some implementations, sensor device 105 may analyze the particular locations of the packet to identify the source address, the destination address, the port, the transport protocol, and/or the like associated with the packet, and may extract the source address, the destination address, the port, the transport protocol, and/or the like associated with the packet based on identifying this information at the particular locations of the packet.

Figure 1F:
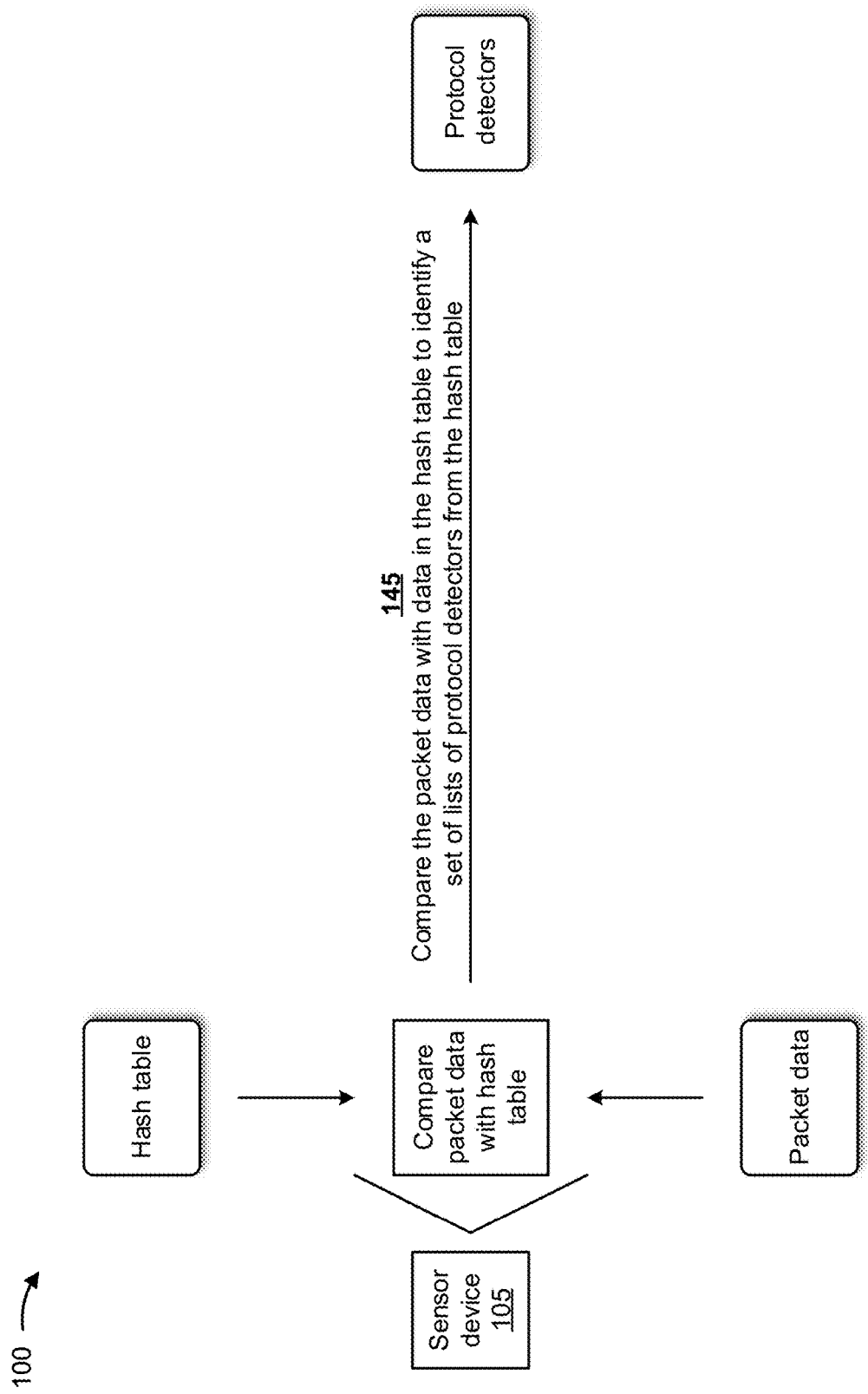

As shown in FIG. 1F, and by reference number 145, sensor device 105 may compare the packet data with data in the hash table to identify a set of lists of protocol detectors from the lists of protocol detectors identified in the hash table. In some implementations, because there is a potential for initial packets to be missed in a packet flow, sensor device 105 may utilize the source address and the destination address to identify lists of protocol detectors (e.g., two lists—one list associated with the source address and one list associated with the destination address) for the set of lists of protocol detectors. Sensor device 105 may identify another list of protocol detectors, for the set of lists of protocol detectors, based on the dummy port value (e.g., a zero value) so that protocol identification for the packet may be port agnostic. Sensor device 105 may combine the identified lists of protocol detectors (e.g., with one or more protocol detectors per list) into the set of lists of protocol detectors. For example, sensor device 105 may allocate the list associated with the destination address as a first list in the set of lists of protocol detectors, may allocate the list associated with the source address as a second list in the set of lists of protocol detectors, and may allocate the list associated with the dummy port value as a third list in the set of lists of protocol detectors.

Figure 1G:
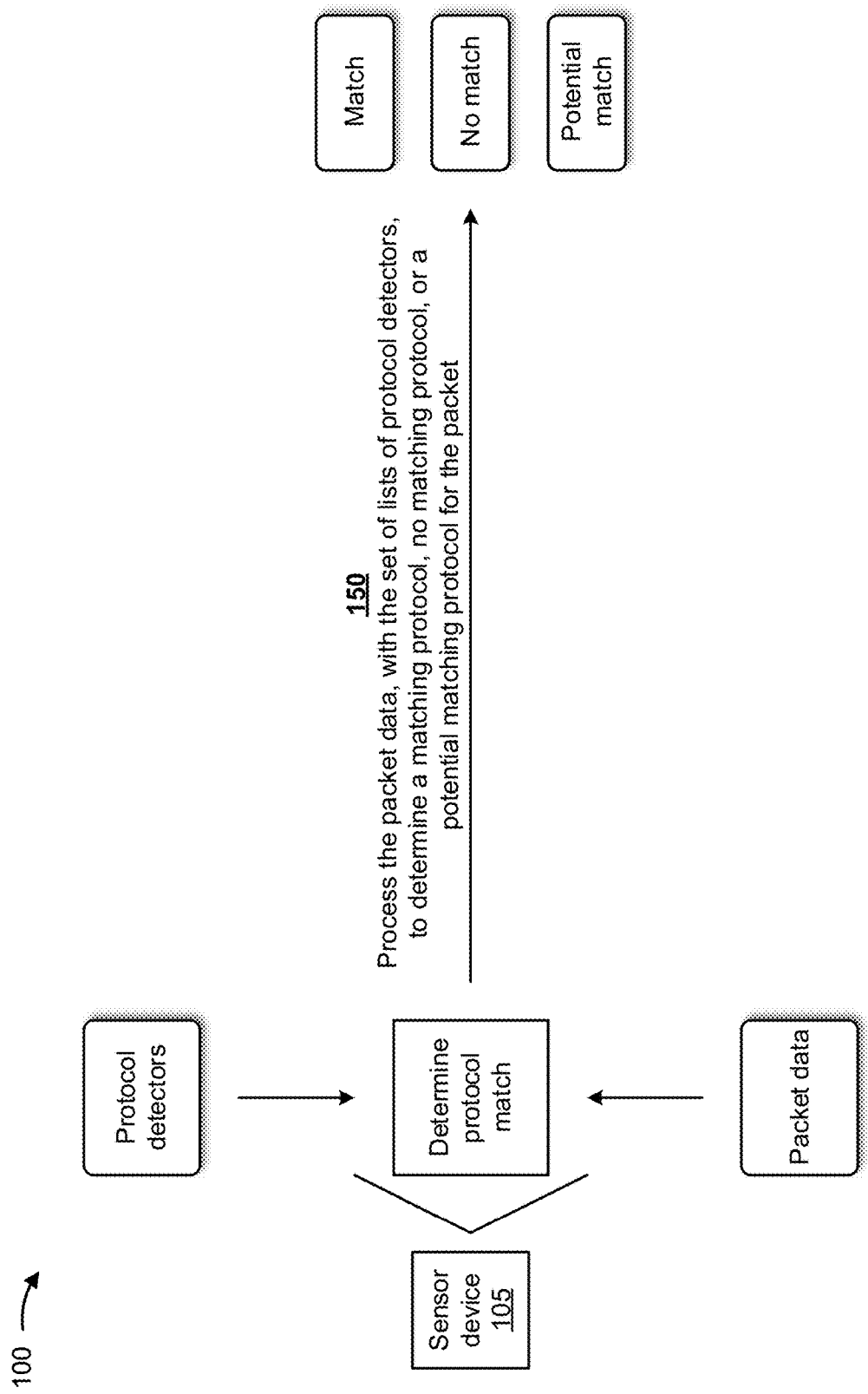

As shown in FIG. 1G, and by reference number 150, sensor device 105 may process the packet data, with the set of lists of protocol detectors, to determine a matching protocol, no matching protocol, or a potential matching protocol for the packet. In some implementations, sensor device 105 may compare the packet with the set of lists of protocol detectors to determine the matching protocol, no matching protocol, or a potential matching protocol for the packet. When comparing the packet data with the set of lists of protocol detectors, sensor device 105 may traverse each of the lists, in the set of lists of protocol detectors, in order of increasing complexity. In this way, sensor device 105 may first execute less complex protocol detectors (e.g., which consumes less resources) and then may execute more complex protocol detectors (e.g., that may be port agnostic, and which consumes greater resources) to minimize execution time associated with the protocol detectors. When a protocol detector executes, the protocol may determine a first result indicating a matching protocol for the packet, a second result indicating no matching protocol for the packet, or a third result indicating a potential matching protocol for the packet. In some implementations, if a matching protocol is determined or no matching protocol is determined, sensor device 105 may cease comparing the packet data with the set of lists of protocol detectors.

In some implementations, the matching protocol may be determined for the packet when all of the packet data matches information associated with the matching protocol provided in the set of lists of protocol detectors. In some implementations, no matching protocol may be determined for the packet when none of the packet data matches information associated with the matching protocol provided in the set of lists of protocol detectors.

In some implementations, the potential matching protocol may be determined for the packet when a threshold quantity of packet data matches information associated with the potential matching protocol provided in the set of lists of protocol detectors. For example, if the destination address and the port of the packet match the information associated with the potential matching protocol, the potential matching protocol may be determined for the packet. In another example, if the source address and the transport protocol of the packet match the information associated with the potential matching protocol, the potential matching protocol may be determined for the packet. In still another example, if only the source address of the packet matches the information associated with the potential matching protocol, the potential matching protocol may not be determined for the packet.

Figure 1H:
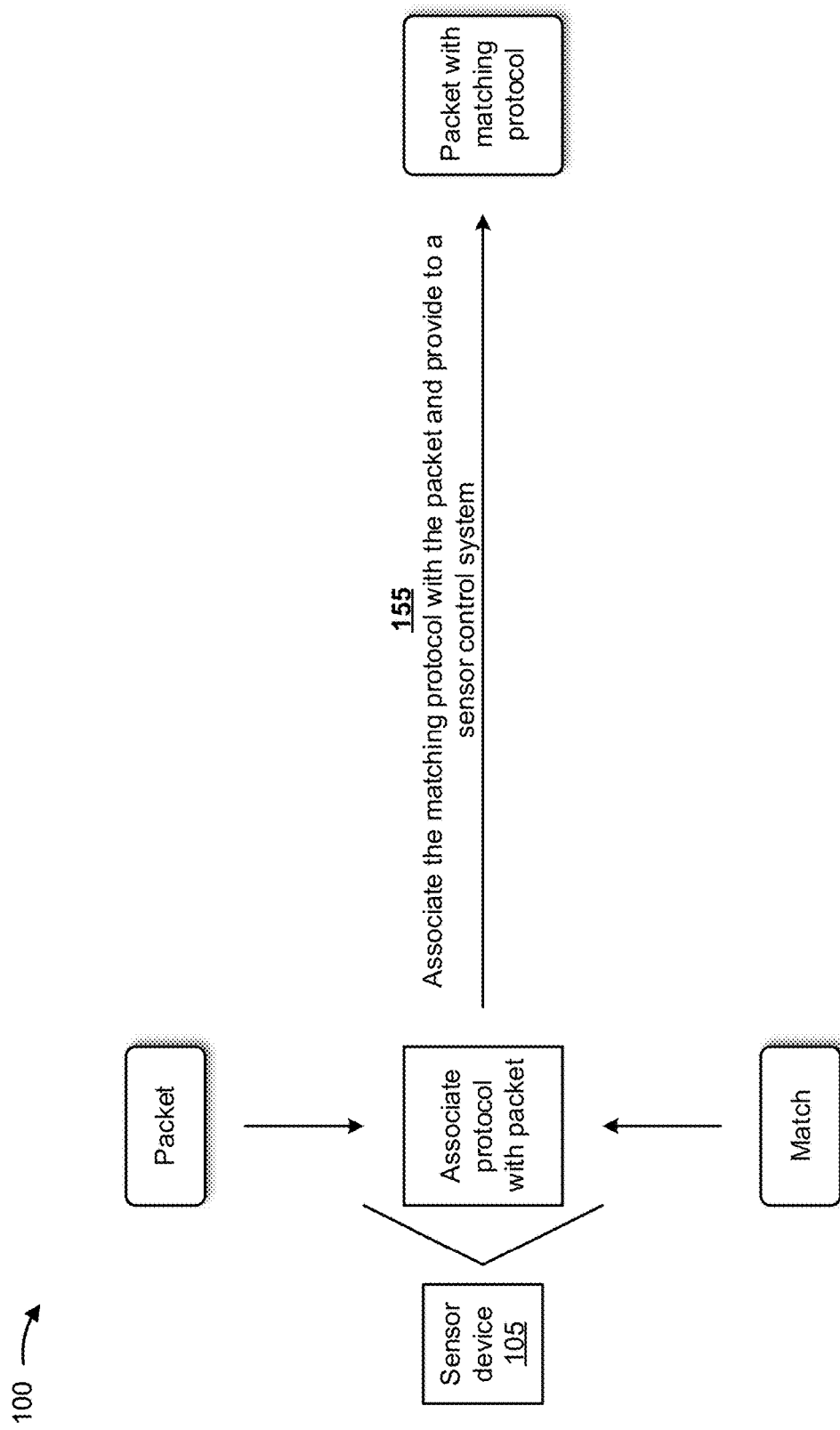

When the matching protocol is determined for the packet, as shown in FIG. 1H and by reference number 155, sensor device 105 may associate the matching protocol with the packet and may provide the packet and information identifying the matching protocol for the packet to sensor control system 115. In this way, sensor control system 115 need not determine the protocol for the packet (e.g., which conserves resources), and may extract feature information (e.g., metadata) from the packet. Extraction of the feature information enables sensor control system 115 to analyze the packet for security purposes and to identify threats to industrial control system 110.

Figure 1I:
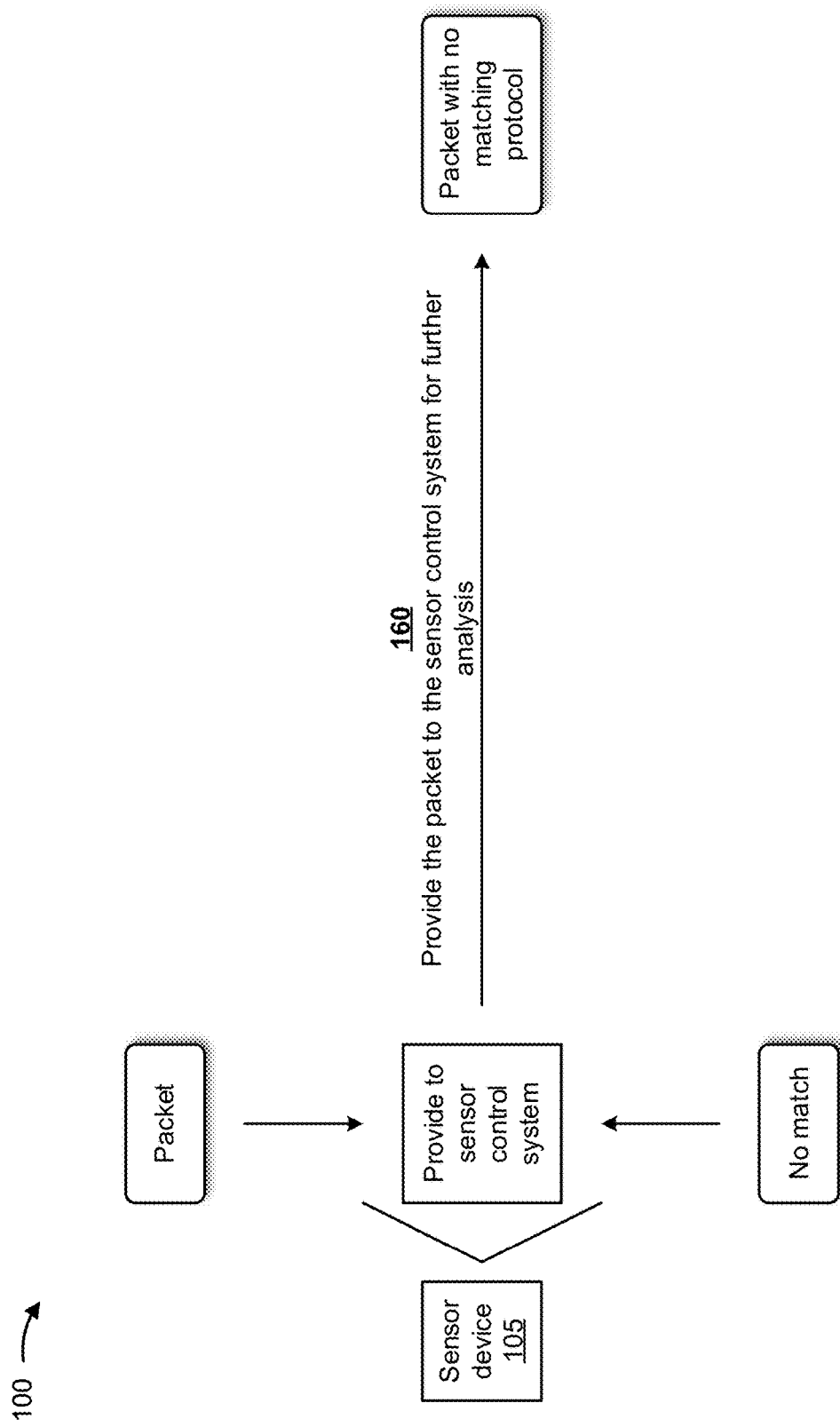

When no matching protocol is determined for the packet, as shown in FIG. 1I and by reference number 160, sensor device 105 may provide the packet and information indicating that no matching protocol was determined for the packet to sensor control system 115 for further analysis. Sensor control system 115 may analyze the packet (e.g., utilizing a deep packet inspect technique or a similar technique) to identify the protocol associated with the packet. Sensor control system 115 may then extract feature information from the packet, may analyze the packet for security purposes, and may identify threats to industrial control system 110.

Figure 1J:
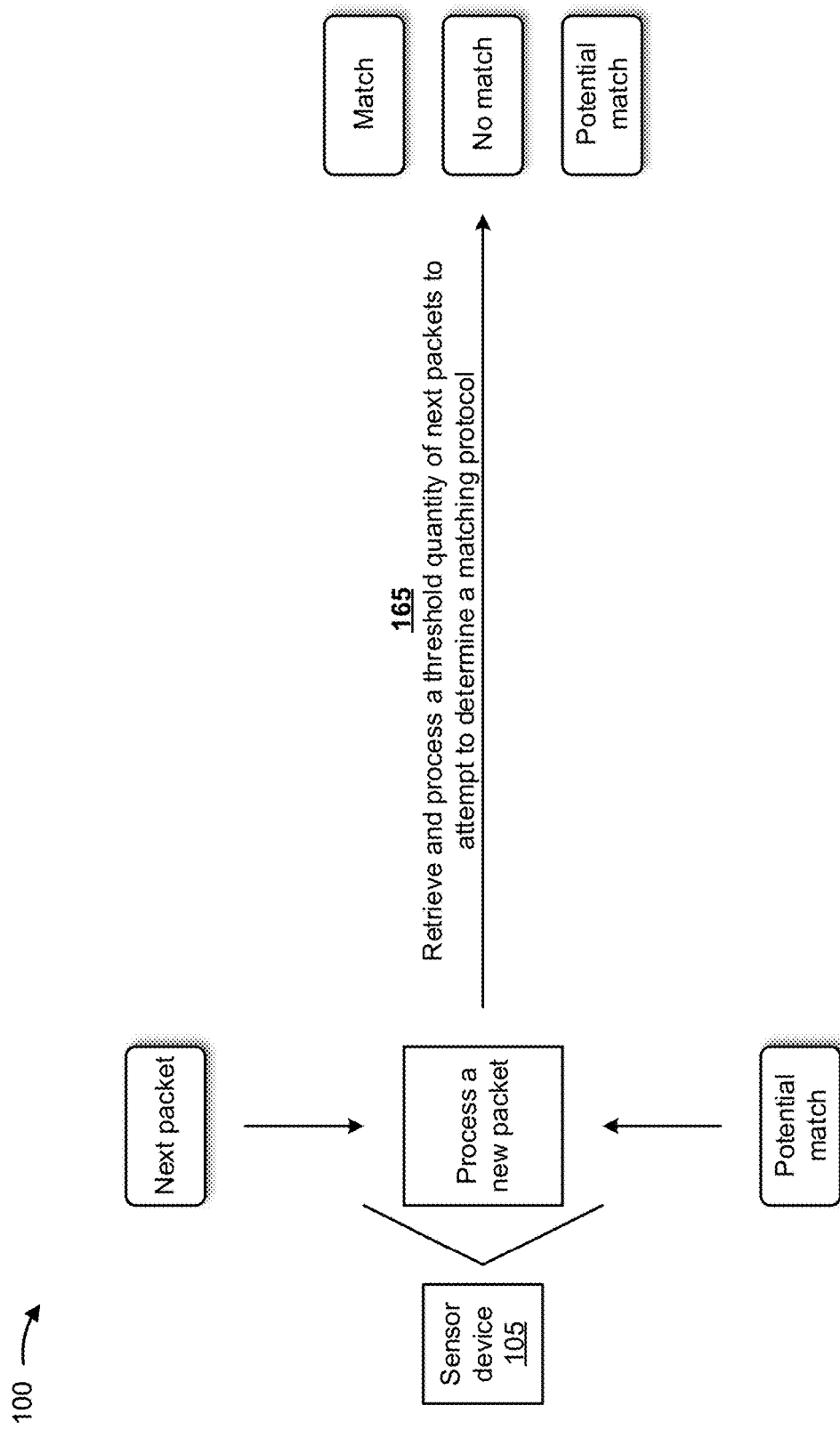

When the potential matching protocol is determined for the packet, as shown in FIG. 1J and by reference number 165, sensor device 105 may retrieve and process a threshold quantity of next packets (e.g., associated with a packet flow of the packet) to attempt to determine a matching protocol. In some implementations, the threshold quantity of next packets may include five next packets, ten next packets, twenty next packets, and/or the like, and may be established to conserve resources associated with sensor device 105.

In some implementations, sensor device 105 may receive a next packet, and may extract next packet data from the next packet. Sensor device 105 may compare the next packet data with the hash table to identify a next set of lists of protocol detectors, and may process the next packet data, with the next set of lists of protocol detectors, to determine a matching protocol, no matching protocol, or a potential matching protocol for the next packet. If no matching protocol is determined for the next packet, sensor device 105 may receive another next packet and may perform the above-mentioned process until the threshold quantity is satisfied or until a matching protocol is determined for the other next packet. If a matching protocol is determined for one of the next packets, sensor device 105 may cease performance of the above-mentioned process and may provide the one of the next packets and information identifying the matching protocol to sensor control system 115.

An example protocol of a packet may include fields set forth in Table 1. The example protocol may be used to illustrate operation of sensor device 105 in identifying the example protocol.

TABLE 1

| Byte Position | Field Width | Field Description |
|---|---|---|
| 0 | 16 bits | Constant value (0 × 1234) |
| 2 | 8 bits | Protocol version (0) |
| 3 | 16 bits | Packet length (big endian) |
| 5 | 8 bits | Function code |
| 6 | Variable | Binary data |
| N − 4 | 32 bits | 32 bit CRC (CRC-32) |

The example protocol may be transmitted over a user datagram protocol (UDP) and may not utilize a well-known port. Protocol specifications may rarely be available and may have to be inferred from inspecting many packets. When a cyclic redundancy check (CRC) or other checksum is involved, such checksums may have to be reverse engineered.

An example protocol detector may be provided in the hash table and may detect the example protocol. The example protocol detector may include the following parameters: port: 0 (e.g., indicates no specific port), Transport protocol: UDP (e.g., over IPv4), and complexity: 32768 (e.g., or any relatively high value). When a packet is received with the example protocol, sensor device 105 may compare the packet data with the hash table to identify lists of protocol detectors matching the packet data. When a list of possible protocol detectors is identified due to the packet including the example protocol, the list of possible protocol detectors may be executed to determine if a matching protocol can be identified.

The example protocol detector may verify that a length of a packet payload is at least a minimum size (e.g., calculated by summing a minimum field size for the packet (e.g., ten bytes)), and may verify that a first two bytes match an observed constant value. The example protocol detector may verify that a next byte (e.g., a protocol version) is zero, may verify that a next field (e.g., a packet length) of the packet matches an identified packet length, and may verify that a computed CRC-32 value of all but the last four bytes matches a last four bytes of the packet.

If any of the above checks fail, no further checks may be made and the example protocol detector may return a false indication. If all of the above checks pass, the example protocol detector may return a true indication and the packet (and an entire packet flow associated with the packet) may be classified as utilizing the example protocol.

Another example protocol of a packet may include fields set forth in Table 2. The other example protocol may be used to illustrate operation of sensor device 105 in identifying the other example protocol. The other example protocol may include a less structured protocol with fewer known fields, may utilize a single well-known port, and may be transmitted over TCP.

TABLE 2

| Byte Position | Field Width | Field Description |
|---|---|---|
| 0 | 16 bits | Packet length (big endian) |
| 2 | 16 bits | Unknown protocol |
| 4 | 8 bits | Transaction identifier |
| 5 | Variable | Unknown |

Another example protocol detector may be provided in the hash table and may detect the other example protocol. The other example protocol detector may include the following parameters: port: 45000 (e.g., a well-known port), Transport protocol: TCP (e.g., over IPv4), and complexity: 1024 (e.g., or any relatively low value). When a packet is received with the other example protocol, sensor device 105 may compare the packet data with the hash table to identify lists of protocol detectors matching the packet data. When a list of possible protocol detectors is identified due to the packet including the other example protocol, the list of possible protocol detectors may be executed to determine if a matching protocol can be identified.

The other example protocol detector may not verify the port since the port is already known, may verify that a length of a packet payload is at least a minimum size (e.g., calculated by summing a minimum field size for the packet (e.g., five bytes)), and may verify that a first two bytes (e.g., a packet length) of the packet matches an identified packet length.

If any of the above checks fail, no further checks may be made and the other example protocol detector may return a false indication. If all of the above checks pass, the other example protocol detector may return a true indication and the packet (and an entire packet flow associated with the packet) may be classified as utilizing the other example protocol.

By using a hash table that includes protocol detectors keyed by port and transport protocol, sensor device 105 may effectively identify protocols that include substantial information but do not utilize well-known ports, protocols that include very little information but utilize well-known ports, and protocols in between. The ability to use port information in this way affords flexibility and functionality to sensor device 105, including an ability to be completely port agnostic. Furthermore, because the port information is incorporated in the hash table, there may be flexibility in a quantity of information required to be present in the packet in order for the protocol to be identified by sensor device 105. In some implementations, multiple sensor devices 105 (e.g., hundreds, thousands, and/or the like) may identify protocols associated with packets and may provide information identifying the protocols to sensor control system 115 for further analysis. This removes the burden on sensor control platform 115 from having to identify the protocols and conserves resources of sensor control platform 115.

In this way, several different stages of the process for identifying unknown protocols associated with industrial control systems are automated, which may remove human subjectivity and waste from the process, and which may improve speed and efficiency of the process and conserve computing resources (e.g., processing resources, memory resources, communication resources, and/or the like), networking resources, and/or the like. Furthermore, implementations described herein use a rigorous, computerized process to perform tasks or roles that were not previously performed or were previously performed using subjective human intuition or input. For example, currently there does not exist a technique that identifies unknown protocols associated with industrial control systems in the manner described herein. Finally, the process for identifying unknown protocols associated with industrial control systems conserves computing resources, networking resources, and/or the like that would otherwise be wasted in collecting data that cannot be utilized due to unknown protocols, identifying the unknown protocols, recollecting the data after identifying the unknown protocols, and/or the like.

As indicated above, FIGS. 1A-1J are provided merely as examples. Other examples may differ from what was described with regard to FIGS. 1A-1J. The number and arrangement of devices and networks shown in FIGS. 1A-1J are provided as an example. In practice, there may be additional devices and/or networks, fewer devices and/or networks, different devices and/or networks, or differently arranged devices and/or networks than those shown in FIGS. 1A-1J. Furthermore, two or more devices shown in FIGS. 1A-1J may be implemented within a single device, or a single device shown in FIGS. 1A-1J may be implemented as multiple, distributed devices. Additionally, or alternatively, a set of devices (e.g., one or more devices) of FIGS. 1A-1J may perform one or more functions described as being performed by another set of devices of FIGS. 1A-1J.

Figure 2:
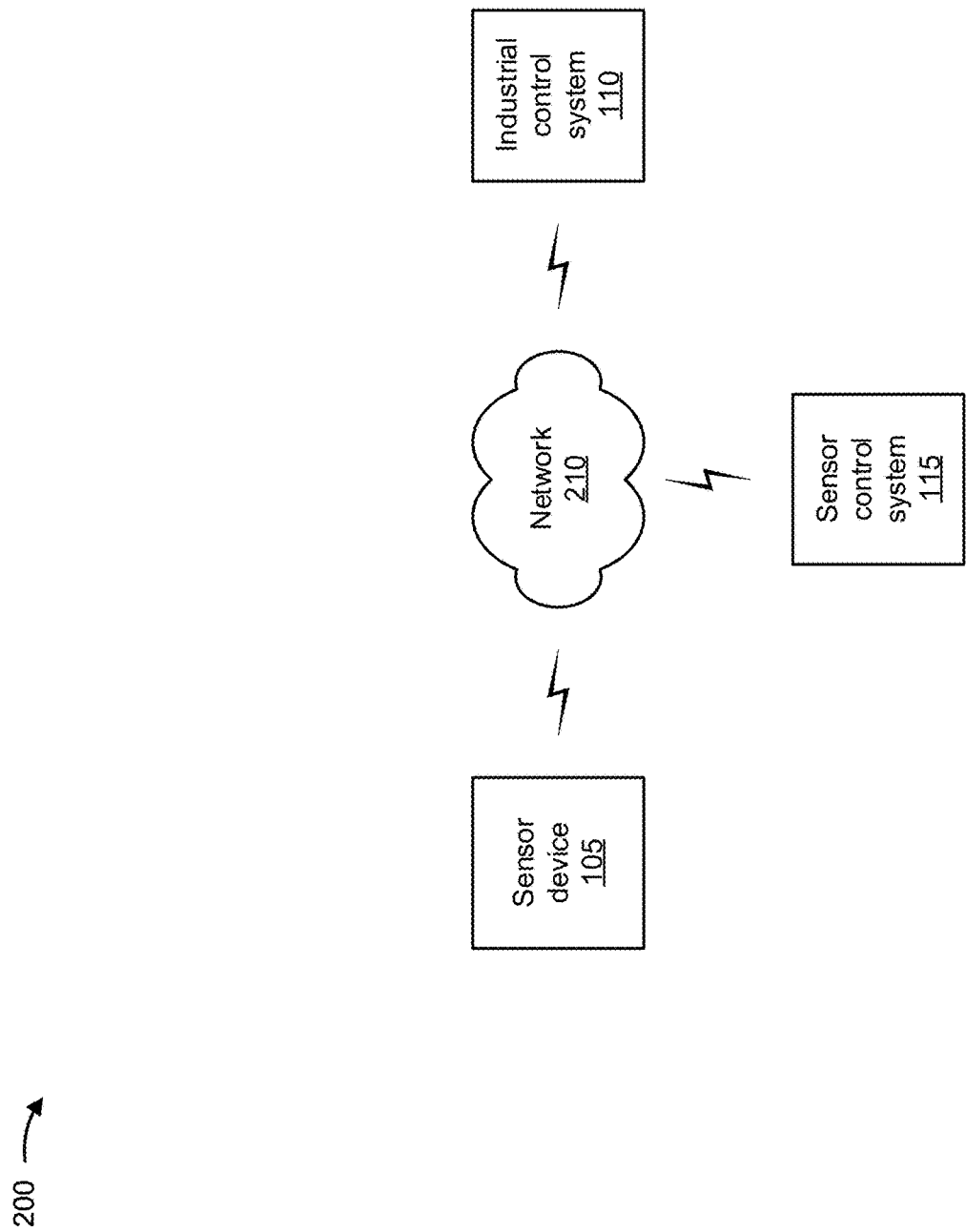
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include sensor device 105, industrial control system 110, sensor control system 115, and a network 210. Devices of environment 200 may interconnect via wired connections, wireless connections, or a combination of wired and wireless connections.

Sensor device 105 includes one or more devices capable of receiving, generating, storing, processing, and/or providing information, such as information described herein. For example, sensor device 105 may include a packet sniffer, a network probe, a packet analyzer, a network analyzer, a protocol analyzer, or a similar type of device. In some implementations, sensor device 105 may receive information from and/or transmit information to industrial control system 110. In some implementations, sensor device 105 may identify unknown protocols associated with industrial control system 110.

Industrial control system 110 includes one or more devices and associated instrumentation that control an industrial process. Industrial control system 110 may range from a few modular panel-mounted controllers to large interconnected and interactive distributed control systems with thousands of field connections. Industrial control system 110 may receive data from remote sensors measuring industrial process variables, may compare the sensor data with predetermined set points, and may derive command functions used to control the industrial process through control elements.

In some implementations, industrial control system 110 may be designed to be modular such that certain software components may be swapped in or out depending on a particular need. As such, industrial control system 110 may be easily and/or quickly reconfigured for different uses. In some implementations, industrial control system 110 may receive information from and/or transmit information to one or more sensor devices 105. In some implementations, industrial control system 110 may be hosted in a cloud computing environment, may not be cloud-based (i.e., may be implemented outside of a cloud computing environment), may be partially cloud-based, and/or the like.

Sensor control system 115 includes one or more devices capable of receiving, generating, storing, processing, and/or providing information, such as information described herein. For example, sensor control system 115 may include a packet analyzer, a network analyzer, a protocol analyzer, and/or the like. In some implementations, sensor control system 115 may monitor and control operation of sensor devices 105, and may receive information from and/or transmit information to one or more sensor devices 105. For example, sensor control system 115 may receive, from sensor devices 105, packets that include process data identifying potential process variables associated with industrial control system 110 and used to control an industrial process, binary data that may be interpreted as physical quantities of process variables, and/or the like.

In some implementations, sensor control system 115 may be designed to be modular such that certain software components may be swapped in or out depending on a particular need. As such, sensor control system 115 may be easily and/or quickly reconfigured for different uses. In some implementations, sensor control system 115 may receive information from and/or transmit information to one or more sensor devices 105. In some implementations, sensor control system 115 may be hosted in a cloud computing environment, may not be cloud-based (i.e., may be implemented outside of a cloud computing environment), may be partially cloud-based, and/or the like.

Network 210 includes one or more wired and/or wireless networks. For example, network 210 may include a cloud-based network, a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks. In some implementations, network 210 may receive information from and/or transmit information to sensor device 105, industrial control system 110, and/or sensor control system 115.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
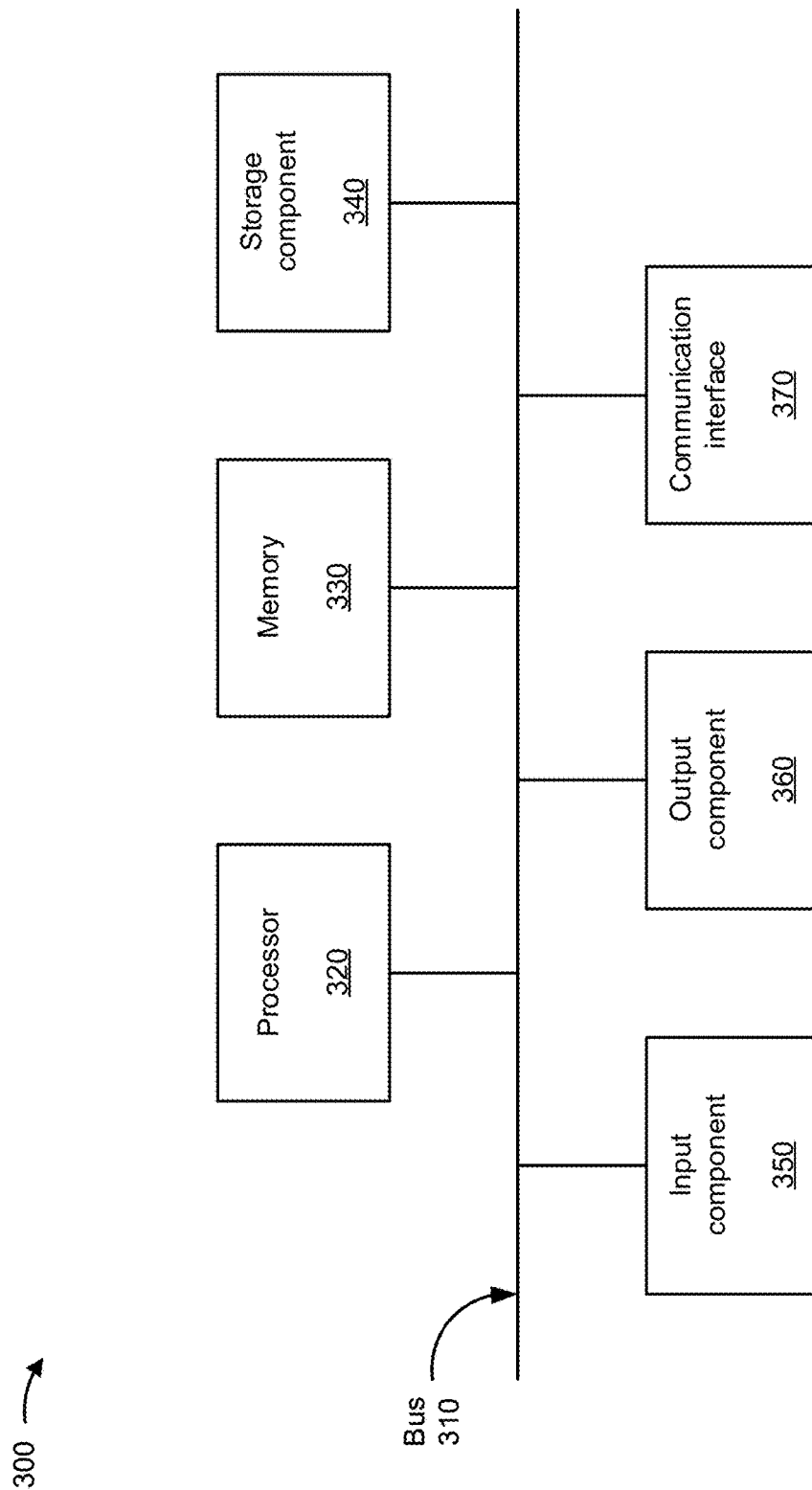
FIG. 3 is a diagram of example components of one or more devices of FIG. 2.

FIG. 3 is a diagram of example components of a device 300. Device 300 may correspond to sensor device 105, industrial control system 110, and/or sensor control system 115. In some implementations, sensor device 105, industrial control system 110, sensor control system 115 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
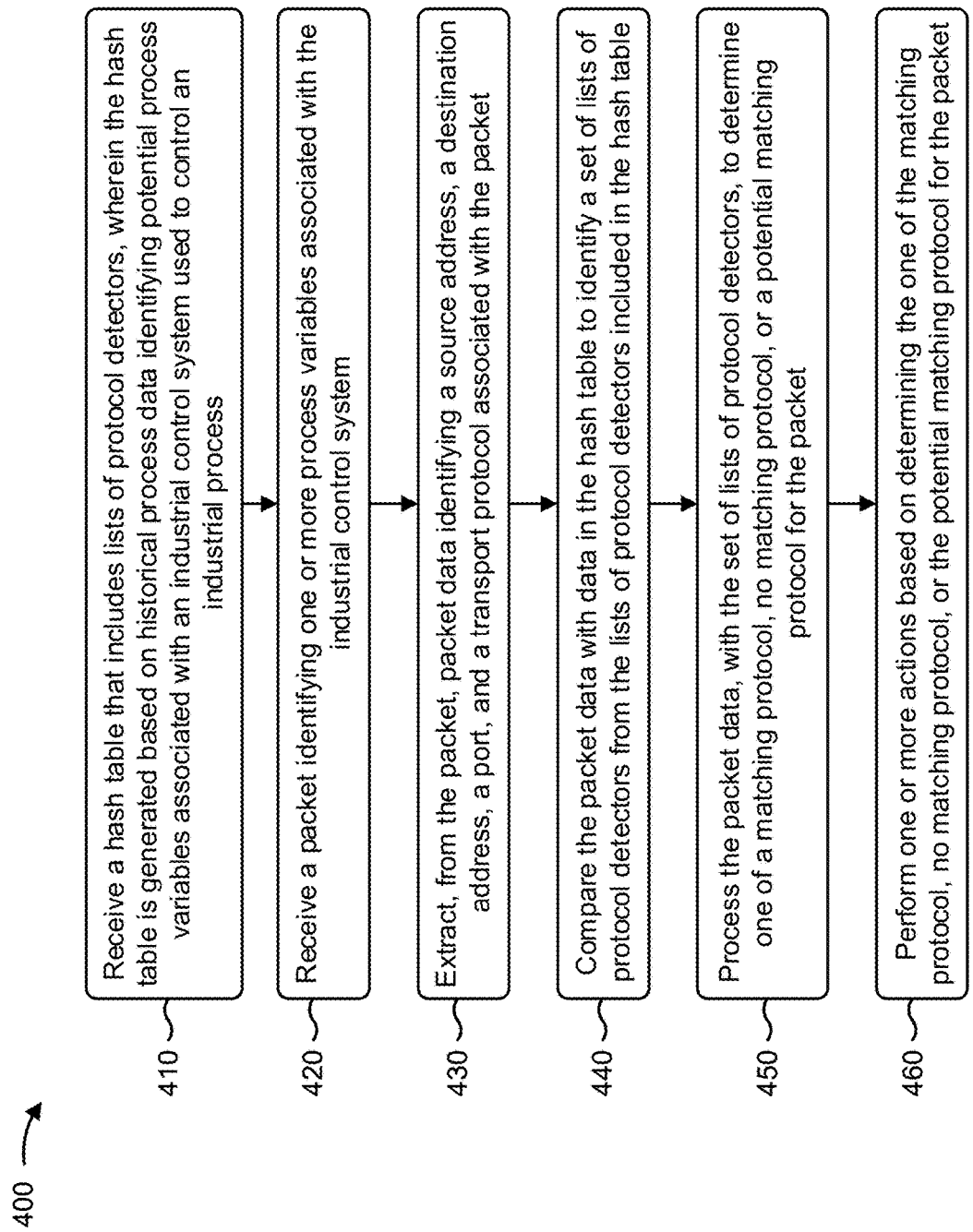
FIG. 4 is a flow chart of an example process for identifying unknown protocols associated with industrial control systems.

FIG. 4 is a flow chart of an example process 400 for identifying unknown protocols associated with industrial control systems. In some implementations, one or more process blocks of FIG. 4 may be performed by a device (e.g., sensor device 105). In some implementations, one or more process blocks of FIG. 4 may be performed by another device or a group of devices separate from or including the device, such as an industrial control system (e.g., industrial control system 110) and/or a sensor control system (e.g., associated with sensor devices 105).

As shown in FIG. 4, process 400 may include receiving a hash table that includes lists of protocol detectors, wherein the hash table is generated based on historical process data identifying potential process variables associated with an industrial control system used to control an industrial process (block 410). For example, the device (e.g., using processor 320, communication interface 370, and/or the like) may receive a hash table that includes lists of protocol detectors, as described above. In some implementations, the hash table may be generated based on historical process data identifying potential process variables associated with an industrial control system used to control an industrial process. In some implementations, the hash table may be generated based on ordering the lists of protocol detectors based on complexity; associating keys with the lists of protocol detectors based on ports and transport protocols; associating at least one specific key with the lists of protocol detectors associated with at least one known port; and associating at least one dummy port value with the lists of protocol detectors associated with at least one unknown port.

As further shown in FIG. 4, process 400 may include receiving a packet identifying one or more process variables associated with the industrial control system (block 420). For example, the device (e.g., using processor 320, memory 330, communication interface 370, and/or the like) may receive a packet identifying one or more process variables associated with the industrial control system, as described above. In some implementations, the packet may include protocol information.

As further shown in FIG. 4, process 400 may include extracting, from the packet, packet data identifying a source address, a destination address, a port, and a transport protocol associated with the packet (block 430). For example, the device (e.g., using processor 320, memory 330, and/or the like) may extract, from the packet, packet data identifying a source address, a destination address, a port, and a transport protocol associated with the packet, as described above.

As further shown in FIG. 4, process 400 may include comparing the packet data with data in the hash table to identify a set of lists of protocol detectors from the lists of protocol detectors included in the hash table (block 440). For example, the device (e.g., using processor 320, storage component 340, and/or the like) may compare the packet data with data in the hash table to identify a set of lists of protocol detectors from the lists of protocol detectors included in the hash table, as described above. In some implementations, comparing the packet data with the data in the hash table to identify the set of lists of protocol detectors may include identifying a first list of protocol detectors, of the set of lists of protocol detectors, based on the destination address associated with the packet; identifying a second list of protocol detectors, of the set of lists of protocol detectors, based on the source address associated with the packet; and identifying a third list of protocol detectors, of the set of lists of protocol detectors, that include a dummy port value.

As further shown in FIG. 4, process 400 may include processing the packet data, with the set of lists of protocol detectors, to determine one of a matching protocol, no matching protocol, or a potential matching protocol for the packet (block 450). For example, the device (e.g., using processor 320, memory 330, and/or the like) may process the packet data, with the set of lists of protocol detectors, to determine one of a matching protocol, no matching protocol, or a potential matching protocol for the packet, as described above. In some implementations, processing the packet data, with the set of lists of protocol detectors, to determine the one of the matching protocol, no matching protocol, or the potential matching protocol for the packet, may include traversing the set of lists of protocol detectors in order of increasing complexity to determine the one of the matching protocol, no matching protocol, or the potential matching protocol for the packet.

In some implementations, processing the packet data, with the set of lists of protocol detectors, to determine the one of the matching protocol, no matching protocol, or the potential matching protocol for the packet, may include determining the matching protocol or no matching protocol for the packet, and ceasing the processing of the packet data, with the set of lists of protocol detectors, as soon as the matching protocol or no matching protocol is determined for the packet.

As further shown in FIG. 4, process 400 may include performing one or more actions based on determining the one of the matching protocol, no matching protocol, or the potential matching protocol for the packet (block 460). For example, the device (e.g., using processor 320, memory 330, storage component 340, communication interface 370, and/or the like) may perform one or more actions based on determining the one of the matching protocol, no matching protocol, or the potential matching protocol for the packet, as described above. In some implementations, performing the one or more actions may include associating the matching protocol with the packet when the matching protocol is determined for the packet, and providing the packet and data identifying the matching protocol to a sensor control system. In some implementations, performing the one or more actions may include providing the packet to a sensor control system for further analysis when no matching protocol is determined for the packet.

In some implementations, performing the one or more actions may include receiving a next packet associated with the packet and after receipt of the packet when the potential matching protocol is determined for the packet, and processing the next packet to attempt to determine another matching protocol for the next packet. In some implementations, performing the one or more actions may include receiving one or more next packets associated with the packet and after receipt of the packet when the potential matching protocol is determined for the packet; determining whether a quantity of the one or more next packets satisfies a threshold; processing, when the quantity of the one or more next packets fails to satisfy the threshold, the one or more next packets to attempt to determine another matching protocol for the one or more next packets; and providing the packet and the one or more next packets to a sensor control system for further analysis when the quantity of the one or more next packets satisfies the threshold.

In some implementations, performing the one or more actions may include updating the hash table based on determining the one of the matching protocol, no matching protocol, or the potential matching protocol for the packet. In some implementations, performing the one or more actions may include providing the packet to a sensor control system for further analysis when no matching protocol is determined for the packet; receiving, from the sensor control system, an identified protocol for the packet based on the further analysis; and updating the hash table based on the identified protocol for the packet.

Process 400 may include additional implementations, such as any single implementation or any combination of implementations described below and/or in connection with one or more other processes described elsewhere herein.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well-known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a device, a hash table that includes lists of protocol detectors,
       wherein the hash table is generated based on historical process data identifying potential process variables associated with an industrial control system used to control an industrial process;
   receiving, by the device, a packet identifying one or more process variables associated with the industrial control system;
   comparing, by the device, packet data, associated with the packet, with data in the hash table to identify a set of lists of protocol detectors from the lists of protocol detectors included in the hash table;
   processing, by the device, the packet data, with the set of lists of protocol detectors, to determine one of a matching protocol, no matching protocol, or a potential matching protocol for the packet; and
   performing, by the device and based on processing the packet data, one or more actions that comprises:
       receiving, based on the potential matching protocol being determined, one or more next packets associated with the packet;
       determining whether a quantity of the one or more next packets satisfies a threshold; and
       performing at least one of:
           processing, based on determining that the quantity fails to satisfy the threshold, the one or more next packets to attempt to determine another matching protocol for the one or more next packets, or
           providing, based on determining that the quantity satisfies the threshold, the packet and the one or more next packets to a sensor control system for further analysis.

2. The method of claim 1, wherein performing the one or more actions comprises:
   associating the matching protocol with the packet when the matching protocol is determined for the packet; and
   providing the packet and data identifying the matching protocol to the sensor control system.

3. The method of claim 1, wherein performing the one or more actions comprises:
   providing the packet to the sensor control system for further analysis when no matching protocol is determined for the packet.

4. The method of claim 1, wherein performing the one or more actions comprises:
   processing the one or more next packets to attempt to determine another matching protocol for the one or more next packets.

5. The method of claim 1, wherein the hash table is generated based on:
   ordering the lists of protocol detectors based on complexity;
   associating keys with the lists of protocol detectors based on ports and transport protocols;

associating at least one specific key with the lists of
protocol detectors associated with at least one known
port; and
associating at least one dummy port value with the lists of
protocol detectors associated with at least one unknown
port.

6. The method of claim 1, wherein comparing the packet data with the data in the hash table to identify the set of lists of protocol detectors comprises:
identifying a first list of protocol detectors, of the set of lists of protocol detectors, based on a destination address associated with the packet;
identifying a second list of protocol detectors, of the set of lists of protocol detectors, based on a source address associated with the packet; and
identifying a third list of protocol detectors, of the set of lists of protocol detectors, that include a dummy port value.

7. A device, comprising:
one or more memories; and
one or more processors communicatively coupled to the one or more memories, configured to:
receive a packet identifying one or more process variables associated with an industrial control system used to control an industrial process;
compare the packet data with data in a hash table to identify a set of lists of protocol detectors from lists of protocol detectors included in the hash table,
wherein the hash table is generated based on historical process data identifying potential process variables associated with the industrial control system, and
wherein the hash table is stored in the one or more memories;
process the packet data, with the set of lists of protocol detectors, to determine one of a matching protocol, no matching protocol, or a potential matching protocol for the packet; and
perform, based on processing the packet data, one or more actions that comprises:
receiving, based on the potential matching protocol being determined, one or more next packets associated with the packet;
determining whether a quantity of the one or more next packets satisfies a threshold; and
performing at least one of:
processing, based on determining that the quantity fails to satisfy the threshold, the one or more next packets to attempt to determine another matching protocol for the one or more next packets, or
providing, based on determining that the quantity satisfies the threshold, the packet and the one or more next packets to a sensor control system for further analysis.

8. The device of claim 7, wherein the one or more processors, when processing the packet data, with the set of lists of protocol detectors, to determine the one of the matching protocol, no matching protocol, or the potential matching protocol for the packet, are configured to:
traverse the set of lists of protocol detectors in order of increasing complexity to determine the one of the matching protocol, no matching protocol, or the potential matching protocol for the packet.

9. The device of claim 7, wherein the packet includes protocol information.

10. The device of claim 7, wherein the one or more processors, when processing the packet data, with the set of lists of protocol detectors, to determine the one of the matching protocol, no matching protocol, or the potential matching protocol for the packet, are configured to:
determine the matching protocol or no matching protocol for the packet; and
cease the processing of the packet data, with the set of lists of protocol detectors, as soon as the matching protocol or no matching protocol is determined for the packet.

11. The device of claim 7, wherein the one or more processors, when performing the one or more actions, are configured to:
update the hash table based on determining the one of the matching protocol, no matching protocol, or the potential matching protocol for the packet.

12. The device of claim 7, wherein the one or more processors, when performing the one or more actions, are configured to:
provide the packet to the sensor control system for further analysis when no matching protocol is determined for the packet; and
receive, from the sensor control system, an identified protocol for the packet based on the further analysis.

13. The device of claim 12, wherein the one or more processors, when performing the one or more actions, are further configured to:
update the hash table based on the identified protocol for the packet.

14. A non-transitory computer-readable medium storing instructions, the instructions comprising:
one or more instructions that, when executed by one or more processors, cause the one or more processors to:
receive a hash table that includes lists of protocol detectors,
wherein the hash table is generated based on historical process data identifying potential process variables associated with an industrial control system used to control an industrial process;
store the hash table;
receive a packet identifying one or more process variables associated with the industrial control system;
compare packet data, associated with the packet, with data in the hash table to identify a set of lists of protocol detectors from the lists of protocol detectors included in the hash table;
process the packet data, with the set of lists of protocol detectors, to determine one of a matching protocol, no matching protocol, or a potential matching protocol for the packet;
receive, based on the potential matching protocol being determined, one or more next packets associated with the packet;
determine whether a quantity of the one or more next packets satisfies a threshold; and
perform at least one of:
processing, based on determining that the quantity fails to satisfy the threshold, the one or more next packets to attempt to determine another matching protocol for the one or more next packets, or
providing, based on determining that the quantity satisfies the threshold, the packet and the one or more next packets to a sensor control system for further analysis.

15. The non-transitory computer-readable medium of claim 14, wherein the instructions further comprise:

one or more instructions that, when executed by the one or more processors, cause the one or more processors to:

provide the packet to the sensor control system for further analysis when no matching protocol is determined for the packet.

16. The non-transitory computer-readable medium of claim 14, wherein the one or more instructions, that cause the one or more processors to process the packet data, with the set of lists of protocol detectors, to determine the one of the matching protocol, no matching protocol, or the potential matching protocol for the packet, cause the one or more processors to:

determine the matching protocol or no matching protocol for the packet; and cease the processing of the packet data, with the set of lists of protocol detectors, as soon as the matching protocol or no matching protocol is determined for the packet.

17. The non-transitory computer-readable medium of claim 14, wherein the instructions further comprise:

one or more instructions that, when executed by the one or more processors, cause the one or more processors to:

update the hash table based on determining the one of the matching protocol, no matching protocol, or the potential matching protocol for the packet.

18. The non-transitory computer-readable medium of claim 14, wherein the instructions further comprise:

one or more instructions that, when executed by the one or more processors, cause the one or more processors to:

provide the packet to the sensor control system for further analysis when no matching protocol is determined for the packet;

receive, from the sensor control system, an identified protocol for the packet based on the further analysis; and update the hash table based on the identified protocol for the packet.

19. The non-transitory computer-readable medium of claim 14, wherein the instructions further comprise:

one or more instructions that, when executed by the one or more processors, cause the one or more processors to:

associate the matching protocol with the packet when the matching protocol is determined for the packet; and provide the packet and data identifying the matching protocol to the sensor control system.

20. The non-transitory computer-readable medium of claim 14, wherein the instructions further comprise:

one or more instructions that, when executed by the one or more processors, cause the one or more processors to:

process the one or more next packets to attempt to determine another matching protocol for the one or more next packets.

\* \* \* \* \*